United States Patent [19]

Boyd

[11] Patent Number: 4,759,896
[45] Date of Patent: Jul. 26, 1988

[54] METHOD AND APPARATUS FOR IMPROVING FLUX REDUCTION FACTORS

[75] Inventor: William A. Boyd, Pittsburgh, Pa.

[73] Assignee: Westinghouse Electric Corp., Pittsburgh, Pa.

[21] Appl. No.: 666,697

[22] Filed: Oct. 31, 1984

[51] Int. Cl.$^4$ .............................. G21C 7/06
[52] U.S. Cl. ................... 376/224; 376/220; 376/245; 376/287; 376/327
[58] Field of Search ............... 376/239, 287, 327, 332, 376/333, 334, 209, 220, 224, 245

[56] References Cited

U.S. PATENT DOCUMENTS

| | | | |
|---|---|---|---|
| 3,212,978 | 10/1965 | Short et al. | 376/327 |
| 3,271,260 | 9/1966 | Noderer | 376/287 |
| 3,868,302 | 2/1975 | Singleton. | |
| 3,929,565 | 12/1975 | Fredin et al. | 376/327 |
| 4,057,463 | 11/1977 | Morita | 176/22 |
| 4,111,747 | 9/1978 | Eck et al. | 376/287 |
| 4,169,760 | 10/1979 | Bevilacqua | 176/36 |
| 4,222,822 | 9/1980 | Mueller et al. | 176/20 |
| 4,285,769 | 8/1981 | Specker et al. | 176/30 |
| 4,432,934 | 2/1984 | Gjertsen et al. | 376/209 |

FOREIGN PATENT DOCUMENTS

| | | |
|---|---|---|
| 0094255 | 11/1983 | European Pat. Off. . |
| 0114659 | 8/1984 | European Pat. Off. . |
| 2629737 | 1/1978 | Fed. Rep. of Germany ...... 376/287 |
| 3339294 | 5/1985 | Fed. Rep. of Germany . |
| 2354612 | 1/1978 | France . |

Primary Examiner—David H. Brown
Assistant Examiner—Richard W. Wendtland

[57] ABSTRACT

A method and apparatus is disclosed for reducing the exposure of pressure vessel welds to fast neutron fluxes. Localized peripheral core areas are provided with rod assemblies which may be made up of nuclear absorbing materials, nuclear reflecting materials, or any combination thereof, and of any desired length so as to reduce the exposure of the welds to such fast neutron fluxes. The rod assemblies are precisely tailored consistent with nuclear calculations to provide the desired effect without substantially reducing core ratings or adversely affecting reactor shutdown margins.

3 Claims, 2 Drawing Sheets

METHOD AND APPARATUS FOR IMPROVING FLUX REDUCTION FACTORS

BACKGROUND OF THE INVENTION

1. Field of the Invention

This invention relates in general to the field of power producing nuclear reactors and in particular to methods and apparatus for improving neutron flux reduction factors outboard of the core periphery.

2. Description of the Prior Art

It is well known that nuclear reactors are both a technical and commercial success. In one type of commercial nuclear power reactors, commonly referred to as a pressurized light water reactor, a reactive region commonly referred to as a nuclear core contains a nuclear fuel such as uranium 235, as well as other fissile materials, which undergo sustained fission reactions and in so doing, generate heat. There are, of course, other materials in the nuclear core, the presence of such other materials, however, is not germane to this invention and, accordingly, will not be discussed. Typically, a group of mechanical components, which are known as reactor internals, structurally support the core within a heremetically sealed pressure vessel. The reactor internals also direct the flow of a cooling medium, such as light water in pressurized, light water nuclear reactors, into the pressure vessel through the nuclear core, and out of the pressure vessel. The cooling medium, which is alternatively called the reactor coolant, removes the heat generated by the fissioning of the nuclear fuel and transfers the heat to another cooling medium within heat exchangers which are typically located external of the pressure vessel. The second cooling medium, which is usually water, is converted into steam in the heat exchangers and is thereafter used to produce electricity by conventional steam turbine-electrical generator combinations.

The nuclear core, in the type of nuclear reactor described herein, usually comprises, an array of fuel assemblies stacked together in a side-by-side parallel arrangement to form a shape approximately that of a right solid circular cylinder. Each of such fuel assemblies include a multiplicity of elongated fuel rods and control rod guide tubes held together in a parallel array by grids spaced along the fuel assembly length. Each fuel rod may comprise an elongated slender hollow tube to be filled with nuclear fuel pellets and sealed at each end. Top and bottom nozzles on opposite ends of the fuel assembly and secured to the guide tubes provide for reactor coolant flow into and out of the fuel assemblies. The guide tubes allow for the insertion of elongated control rod assemblies into the nuclear core and dispersed among the nuclear fuel. The control rod assemblies provide for reactor control and serve to accomplish other neutronic purposes.

The reactor internals may include a core barrel comprising an elongated cylinder which is interposed between the nuclear core and the cylindrical wall of the pressure vessel. The nuclear core then is positioned within the core barrel. Typically, the reactor coolant enters the pressure vessel through one or more inlet nozzles, flows downward between the pressure vessel and the outside of the core barrel, turns 180°, and flows upward through the core and through the space between the outside of the core and the inside of the core barrel. The heated reactor coolant then turns 90° and exits the pressure vessel through one or more exit nozzles and then to the heat exchangers previously mentioned.

In the pressurized light water reactors, such as the one described, the fissioning of the nuclear fuel results from the capture of a neutron by the nucleus of the atoms of the nuclear fuel. It is well known that each neutron producing a fission causes heat and the production of more than one other neutron (on the average 2.1 neutrons are released per capture). To sustain the nuclear chain reaction, at least one of the newly produced neutrons must then fission another atom of fuel. Since the neutrons generated are fast neutrons, and fissioning is enhanced by slow neutrons, it is advantageous that the fast neutrons be slowed down or thermalized within the confines of the nuclear core. The light water reactor coolant is an excellent moderator of neutrons; hence, in reactors primarily using U-235 as the nuclear fuel, it is the primary means by which the fast neutrons produced by the fission process are thermalized or slowed down so as to increase the probability that another fission may occur and thereby sustain the chain reaction. The excess neutrons produced by the fissioning of an atom and not used to fission another atom are accounted for in a number of different ways. Some are absorbed by the reactor internals. Others are slowed down and absorbed by a nuclear poison such as boron which is dissolved in the primary coolant. Other neutrons are absorbed by load follow control rods containing nonburnable control poisons which control rods comprise the means for controlling the nuclear reactor. Others are absorbed by special control rods which are interspersed throughout the nuclear core and made of materials specifically selected to absorb neutrons such as burnable poisons which as their name implies are burned during reactor operation and, therefore, become less effective in proportion to the continually reducing reactivity of the nuclear core. Still other neutrons are absorbed by poisons which build up within the nuclear fuel and are caused by the fission process itself.

Quite obviously, the accounting for the excess neutrons is a complicated matter which can, however, be summarized by stating that some excess neutrons are purposefully absorbed while the remainder are inadvertently absorbed. And, it is desirable to reduce the number that are inadvertently absorbed.

In order to extend the life of the nuclear core as long as is practical so as to minimize time consuming reactor shutdowns for refueling purposes, the fuel assemblies may be provided with enriched nuclear fuel, usually enriched uranium 235. This excessive amount of reactivity is designed into the core at startup so that as the reactivity is depleted over the life of the core, the excess reactivity is then used, thereby extending the life of the core. The amount of enrichment continuously decreases as the reactor operates until such time as the core can no longer sustain the chain reaction. Then the reactor must be shut down and refueled. During the initial stages of reactor operation or during the phase which is known as beginning of life, special neutron absorbing control rods may be inserted within the core and/or additional soluble poisons may be dissolved within the reactor coolant and/or burnable poisons may be included within the fuel assemblies to absorb the excess reactivity. As the excess reactivity decreases due to the nuclear fuel being burned, the amount of insertion of the special control rods and/or the amount of soluble poison and-/or the burnable poisons within the special control rods and/or the fuel assemblies are consumed consistent with the reduction in excess reactivity to maintain the chain reaction. In this manner, the excess reactivity is held in abeyance until it is needed.

Enriched uranium is extremely expensive. It is preferable, therefore, to reduce the amount of enrichment whenever possible but without reducing the extended operating length of the life of the core. One recognized method to accomplish this result is by making more efficient use of the neutrons produced by the fission process. In general, such techniques are classified as fuel management techniques. Throughout the years of successful reactor operation, a significant amount of experience has been gained in the area of fuel management. As a result, a three-phase core loading plan has been developed whereby the core is divided into three regions, with each region receiving either new, once burned or twice burned fuel. After a period of reactor operation, the most burned fuel is removed and replaced by the now twice burned fuel which in turn is replaced by the now once burned fuel which is replaced by new fuel. Such a fuel management technique has been termed as out-in-in fuel management, which as its name implies moves fuel radially from the outer core regions progressively inward and toward the center of the core.

The out-in-in fuel management technique has been gradually replaced with a more economical low leakage loading pattern. While more complicated than the out-in-in pattern, the low leakage pattern significantly improves the neutron economy of fuel reload cycles and has thereby reduced the fuel cycle cost for a given energy output. The low leakage loading fuel management technique is designed to minimize the leakage of fast neutrons from out of the core so that these neutrons, as previously explained, may be used for fissioning purposes. Time and reduced fuel cycle costs have verified the success of the low leakage loading pattern.

As an adjunct to the lowering of fuel costs from the use of the low leakage loading pattern, it has been determined that this pattern also results in improved flux reduction factors. That is, the high energy neutron flux which radially emanates from the nuclear core and which may ultimately irradiate the pressure vessel walls is reduced by the low leakage loading pattern. Needless to say, such an effect is obviously advantageous whether achieved by design or otherwise. One complication with the low leakage loading pattern is that it may or may not address a limiting region of the pressure vessel. Indeed, it is even possible that a particular low leakage loading pattern which is designed only to effectuate fuel cycle cost savings may have no effect at all or may even exacerbate neutron irradiation of a particular limiting pressure vessel location such as a weld.

Another complication with using the low leakage loading pattern to improve the flux reduction factor is that the improvement may not be sufficient. Indeed, calculations have been made which show this to be the case. In other words, the low leakage loading pattern may not only be a hit or miss situation but does not sufficiently reduce the irradiation of the pressure vessel walls by high energy flux. Where the loading pattern was adjusted in order to specifically achieve adequate flux reductions, it created unacceptable component thermal margins and adversely affected loss of coolant analysis margins.

Another ostensible solution to reduce pressure vessel neutron fluence is to replace certain of the peripheral fuel assemblies around the core with rods made, for example, of stainless steel. This plan would remove those fuel assemblies contributing to the irradiation of the pressure vessel and add a neutron absorber material between the core and the pressure vessel. Such a solution is not acceptable because of the corresponding reduction in core power rating and, therefore, lower the power output by the power plant.

Another inappropriate solution would be to place additional shielding between the core periphery and the pressure vessel. This solution is unsatisfactory because of space restrictions, requires extensive mechanical redesign and neutronic evaluation of the region outboard of the core, is costly, and requires too much time to effectuate.

Reducing the power output by the peripheral fuel assemblies to sufficiently reduce the fast flux level will cause an unacceptable power reduction in the peripheral fuel region in order to achieve a localized fast flux reduction. To maintain the same total core power output, the inboard region power must increase substantially. This creates unacceptable component thermal margins and adversely affects loss of coolant analysis margins. Hence, this is not a viable solution.

Accordingly, a primary object of the present invention is to provide a method and apparatus to achieve relatively localized fast flux reductions at the core periphery in both the axial and circumferential directions.

Another primary object of the present invention is to provide such localized fast flux reductions on a retrofittable basis; that is, to provide that the method and apparatus may be used with presently built and/or operating nuclear power reactors.

Another primary object of the present invention is to achieve the fast flux reduction without materially adversely affecting core rating and/or power output and/or reactor shutdown margins and/or core thermal margins.

Still another primary object of the present invention is to achieve the fast flux reduction without materially adversely affecting the fuel cycle costs.

The above objects as well as others which are apparent from a reasonable reading and interpretation of this specification, and although they may not be specifically mentioned are all intended to be included within the scope of the invention provided herein.

SUMMARY OF THE INVENTION

The present invention accomplishes the above objectives and comprises a method and apparatus for forming a curtain at the core periphery to reduce the amount of fast neutrons emanating outward from the core and thereby prevent the pressure vessel from being exposed to such a fast neutron flux.

Peripheral fuel assemblies are provided with specially designed displacer rods and/or neutron absorber and/or reflector rods so as to retard the production of fast neutrons and to reflect fast neutrons and to absorb fast neutrons which otherwise would escape from the nuclear core. Thus, a curtain of neutron reflecting and/or absorbing rods is provided at the core periphery. The strength of the absorber and the reflector rods may be varied radially and axially so as to provide a curtain specially adapted to function with particular reactors and/or pressure vessels.

Various other objects, advantages and features of the invention will become apparent to those skilled in the art from the following discussion taken in conjunction with the following drawings, in which:

DESCRIPTION OF THE PREFERRED EMBODIMENTS

Figure 1:
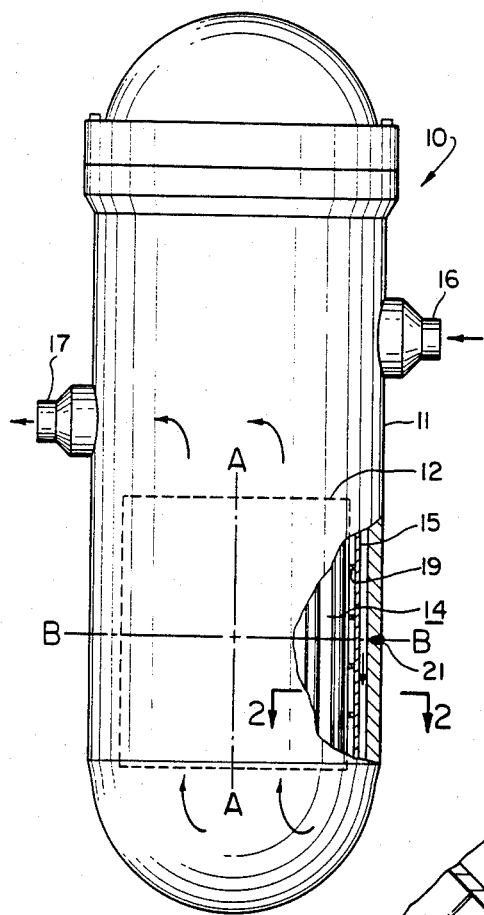
FIG. 1 is an elevational view of a typical nuclear reactor, partially in cross section, to which the present invention may be applied.

Referring now to the drawings where similar features of the invention are designated by the same reference numerals among the various figures of the drawings. FIG. 1 illustrates a type of pressurized light water nuclear reactor 10 to which the present invention may be adapted. The invention, however, is not to be limited to such a reactor 10 which is being described primarily for purposes of description and explanation of the invention.

A pressure vessel 11 houses a nuclear core 12 which is structurally supported therein by a set of components which are often referred to as the reactor internals (not completely shown). The nuclear core typically comprises a plurality of fuel assemblies 14, square in cross section, and stacked side by side in a parallel array. The nuclear core 12 has a resulting shape which approximates that of a right circular cylinder with the periphery being irregular or stepped when viewed in cross section due to the square configuration of the fuel assemblies 14. This may be partially seen in FIG. 2.

The reactor internals include a core barrel 15 which separates the reactor coolant flow entering the pressure vessel 11 (through nozzle 16) from the reactor coolant exiting the pressure vessel 11 (through nozzle 17). In this manner, the reactor coolant flow may be directed down the outside of core barrel 15, turn 180° and flow up through the nuclear core 12. The reactor internals also serve to make the transition from the irregular shape of the core periphery to the circular shape of the core barrel 15. Typically, vertical stainless steel plates 18 are positioned against the irregular core pheriphery. The vertical plates are supported by a plurality of horizontally positioned former plates 19 which are bolted to the vertical plates 18. The former plates 19 are in turn, bolted to the core barrel 15. The space between the horizontal former plates 19 is filled with water which flows in the same direction through the nuclear core 12. Since this flow is core bypass flow, it is desirable to maintain the flow at a minimum value yet sufficient to cool the former plates 19, vertical plates 18 and core barrel 15.

Pressure vessel 20 is typically made from steel plates which are welded together in the axial and/or circumferential directions as represented by the axis A—A and/or B—B in FIG. 1 which respectively represent the centerlines of such welds. It is to be understood that the locations of such welds are not necessarily fixed relative to the nuclear core 12. However, once a reactor is fitted with a nuclear core, then the location of the pressure vessel welds are fixed relative to that core and any other core later loaded into that pressure vessel throughout the lifetime of that reactor. Viewed differently, for any given reactor, the orientation of the irregular core periphery is fixed relative to the welds (A—A or B—B) joining the plates making up the pressure vessel. In the example shown in the drawings, horizontal weld 21 is located approximately at core midplane and vertical weld 22 is located opposite the corner 23 of fuel assembly 14'''. As illustrated, welds 21 and 22 are thus exposed to the most severe fast flux condition. In actual practice this may not be the case; there may be only one weld or such welds may be exposed to the least severe fast flux condition. It is necessary that the location of the actual welds of a pressure vessel be determined relative to the core location and orientation and relative to the power and fast neutron flux distribution (horizontal and vertical) output by a particular core.

Figure 2:
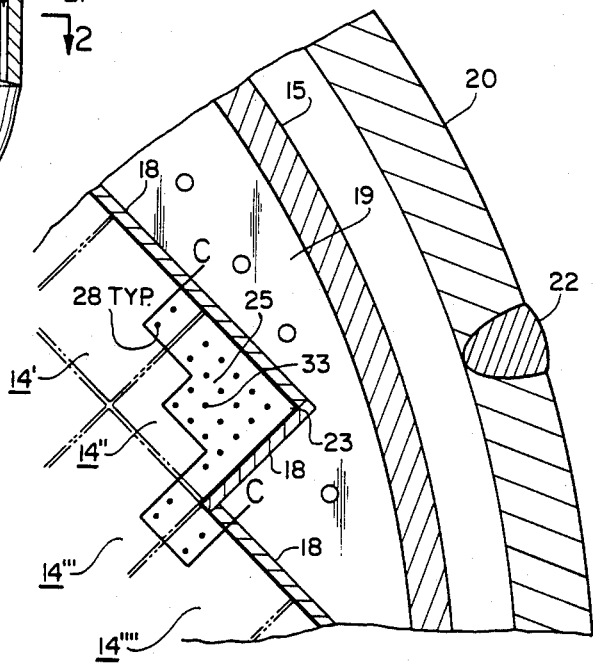
FIG. 2 is an enlarged, cross-sectional view of a portion of the core, core periphery and pressure vessel of the reactor of FIG. 1 taken across the line 2—2 of FIG. 1; and, FIG. 3 is an isometric view of a portion of one example of a curtain rod as fitted to an array of peripheral fuel assemblies.

Still referring to FIG. 2, irregular line C—C in combination with plates 18 circumscribe an arbitrary area of the core 25 which for purposes of providing an example for the description of the invention is to be deemed to materially contribute to the fast neutron flux to which weld 22 is exposed. As can be seen, area 25 encompasses parts of fuel assemblies 14', 14'', 14''', and 14''''. Appropriate nuclear calculations are required to be performed to determine the actual contribution to the fast neutron flux from each fuel rod in the peripheral core area and to determine the amount of displacer rods and/or nuclear poisoning needed to reduce the fast flux at the welds of the pressure vessel 11 to an acceptable level. For further description of the invention, it will be assumed that the calculations show that core peripheral area 25 described by line C—C needs to be provided with displacer rods and/or poisoned and/or provided with nuclear reflective material. The displacer rods which may comprise solid or sealed hollow tubes fit within openings within the fuel assemblies which contain a nuclear moderator (in the described reactor 10, the moderator comprises the light water reactor coolant.) By displacing the moderator within area 25, less moderating of the fast neutrons (produced by the fissioning of the nuclear fuel) occurs, which causes less fission to occur and, therefore, causes less fast neutrons to be produced. In this manner, weld 22 is exposed to less fast neutrons. If a nuclear poison rod is used, it will have the beneficial effect of the displacer rods and absorb some of the slow or moderated neutrons which are available for fissioning; and, thereby, additionally reduce the production of the fast neutrons which additionally reduces the number of fast neutrons which would be absorbed by weld 22. The nuclear poison would also absorb some of the fast neutrons to which the weld 22 would be otherwise exposed. If a reflector rod is used, it will provide the beneficial effect of the displacer rod and will reflect some neutrons back into the core and away from weld 22. Any of the techniques or a combination of such techniques may be employed with equal effectiveness consistent with and as constrained by the aforementioned nuclear calculations.

Figure 3:
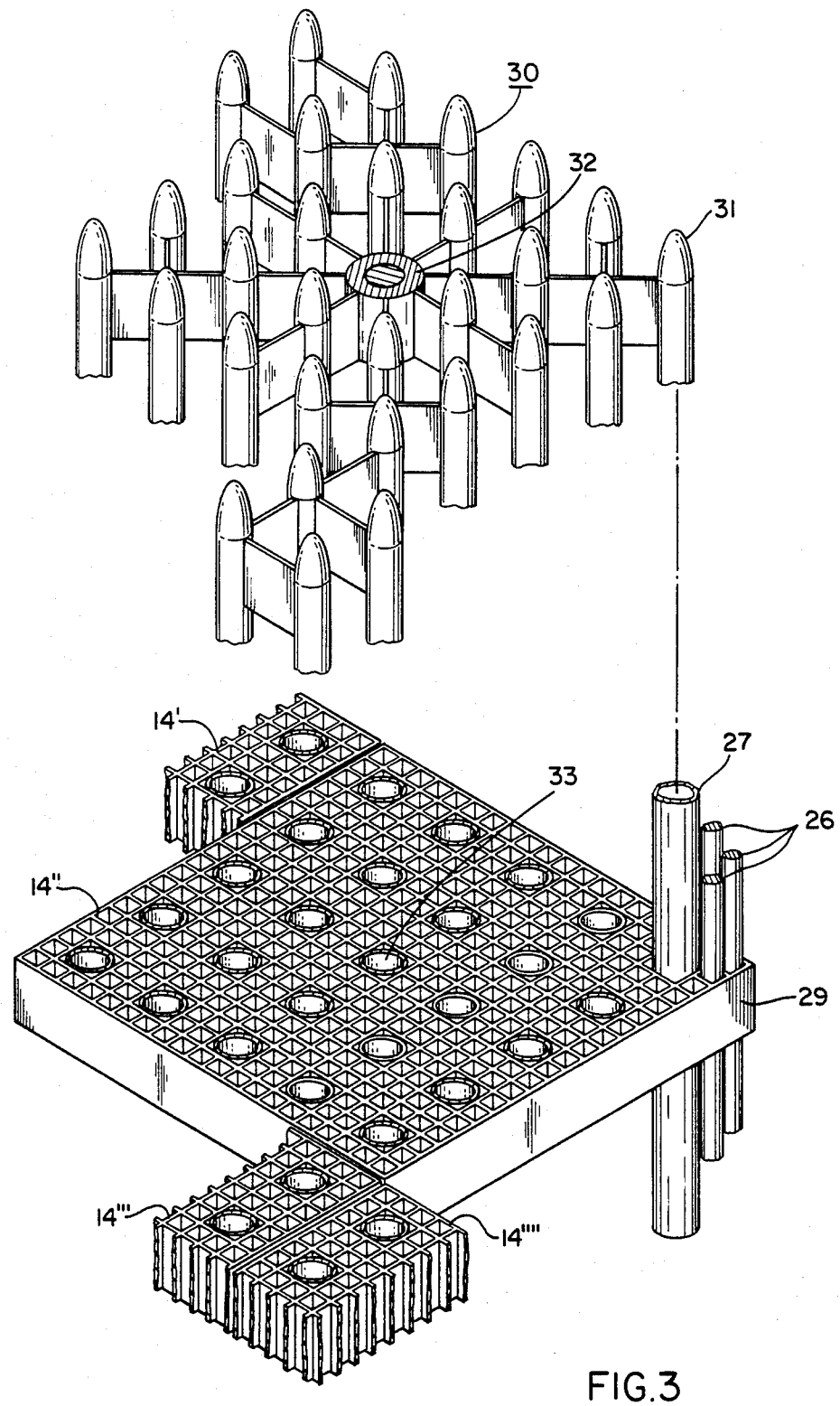

FIG. 3 illustrates, in the lower portion thereof, a partial cross section of the core 12 including core area 25 taken along the grids 29 of fuel assemblies 14', 14'', 14''' and 14''''. Grids 29 typically are positioned at various locations along the length of fuel assembly 14 and serve to space and support a plurality of parallel arranged fuel rods 26 and control rod guide thimbles 27 at appropriate distances from each other so as to allow the reactor coolant to circulate in heat transfer relationship with fuel rods 26. Such grids 29 are well known in the art. As can be seen, guide thimbles 27 comprise hollow tubes which are attached to grid 29 and are spaced or distributed over the cross section thereof. Fuel assemblies 14 are thus comprised of fuel rods 26, guide thimbles 27 and grids 29.

Guide thimbles 27 serve to guide the movement of control rods which fit within guide tubes 27. Control rods primarily serve to control the power output of the nuclear reactor 10, and are well known in the art. Typically, control rods comprise pellets of a nuclear absorbing material stacked end on end within hollow tubes and sealed at the ends. A plurality of such tubes are then attached to a central hub which is connected to a control rod drive mechanism. Since any fuel assembly 14 may be placed at any location within core 12, it is common practice to have each fuel assembly 14 equipped with the same number of guide tubes 27 and that they be positioned at the same location within the fuel assembly. In this manner, the position and operation of the control rod assemblies are not constrained by any fuel assembly 14; and, as explained, any fuel assembly 14 can be placed anywhere in the core 12. Typically, control rod assemblies are not located at the core pheriphery, but the fuel assemblies 14 at the core periphery are equipped with guide tubes 27. Hence, the guide tubes 27 in the fuel assemblies 14 at the core periphery are not used. The centermost opening 33 in fuel assembly 14 is typically provided for purposes of instrumentation and accordingly, is not available for one of the rods of the present invention. The dots 28 in FIG. 2 within core area 25 represent the location of unused guide tubes 27 in fuel assemblies 14.

Referring again to FIG. 3, a displacer/absorber/reflector rod assembly 30 is shown therein. Displacer/absorber/reflector rod assembly 30 comprises a plurality of displacer/absorber/reflector rods 31 arranged parallel to each other and attached to hub 32. The arrangement of displacer/absorber/reflector rods 31 on assembly 30 coincides with the location of guide tubes 27 in core area 25. Thus, each of rods 31 fit within guide tubes 27 of core area 25. Rods 31 may comprise a displacer rod in the form of a hollow sealed tube made, for example, from zirconium alloy or stainless steel. Or, rods 31 may comprise a displacer/reflector rod made, for example, from a solid material such as stainless steel, or any other suitable reflector material, or may comprise a sealed hollow tube filled with a reflector material such as zirconia, or any other suitable reflector material. Or, rods 31 may comprise a displacer/absorber rod made as conventional control rod absorber rods are made and using the same materials: for example, boron carbide, cadmium-indium-silver, hafnium, etc. Or, rods 31 may comprise a combination of such displacer rods containing absorbing materials and reflecting materials appropriately positioned along the length of rod 31. Such absorbing and/or reflecting materials may extend the full length of rods 31. Or rods 31 may comprise a portion of reflector and/or absorber material appropriately located between particular core axial positions with the remainder of the rod 31 being substantially nonabsorbing and/or nonreflecting. Or, rods 31 may have any desired length. In essence, rod assembly 30 may be precisely tailored in its makeup as determined by the nuclear calculations previously mentioned. The various combinations are limitless. Also. any core area may be provided with one or more rod assemblies 30.

The displacer/absorber/reflector rod assembly 30 may be positioned within its designed area 25 during core loadings or reloadings and simply left there during subsequent reactor operation. Rod assembly 30 may be conventionally sandwiched between the core upper and lower support plates (not shown) so as to retain the same in its assembled position during reactor operation.

In carrying out the method of the invention, the following procedure may be used. The relationship of the core 12 relative to the horizontal B—B and/or vertical A—A welds on the pressure vessel 11 are documented. Calculations and/or measurements of the fast neutron flux (greater than one million electron volts or other agreed upon value) are ascertained at the location of the welds. Using whatever criteria is desired, by which the value of the neutron flux is to be reduced, calculations are made which determine the size and location of the core peripheral area which is to be provided with one or more rod assemblies 30 and to determine whether reflection and/or absorption is required in addition to the displacer rod effect and over what length and at what axial location. Based on such calculations, the precisely tailored rod assemblies are fabricated and loaded into position at the desired core location. The reactor is thereafter normally operated at rated power. Measurements may be made during reactor operation to verify the design and placement of the displacer/absorber/reflector rods and if any changes are deemed warranted, they may be carried out as per the above-described procedure.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. In a coolant moderated nuclear reactor including a nuclear core positioned within a pressure vessel, said nuclear core comprising a plurality of fuel assemblies extending to the periphery thereof, said pressure vessel having at least one axial or circumferential weld thereon, a method for reducing the value of the neutron flux to which said welds are exposed comprising the steps of determining the areas of the core periphery causing each of said welds to be exposed to high neutron flux levels determining the axial and circumferential locations of the core causing each of said welds to be exposed to high neutron flux levels determining the amount of moderating displacer material taken from the group consisting of boron carbide, cadmium, indium, silver, or hafnium needed to reduce the amount of the high neutron fluxes to which said welds are exposed to acceptable levels at each of the core areas and axial locations positioning said displacer material in a parallel arrangement within said fuel assemblies at the core periphery substantially axially and circumferentially adjacent to said welds exposed to high neutron flux levels.

2. In a coolant moderated nuclear reactor including a nuclear core positioned within a pressure vessel, said nuclear core comprising a plurality of fuel assemblies extending to the periphery thereof, said pressure vessel having at least one axial or circumferential weld thereon, means for reducing the amount of neutron flux to which said at least one axial or circumferential weld is exposed, said neutron flux reducing means being positioned within the periphery of said nuclear core and interspersed within the fuel assemblies at the core periphery substantially axially and circumferentially adjacent to one or more of said at least one axial or circumferential weld, respectively, said flux reducing means comprising a plurality of parallel arranged moderator displacer rods which are made from a neutron absorber material taken from the group consisting of boron carbide, cadmium-indium-silver, or hafnium.

3. The apparatus of claim 2, wherein said displacer and absorber rods are attached to a common hub.

* * * * *